United States Patent
Kabrich

(10) Patent No.: US 10,619,609 B1
(45) Date of Patent: Apr. 14, 2020

(54) FUEL TRAIN CONTROL USING A MULTI-POSITION GAS SHUT-OFF VALVE

(71) Applicant: Caterpillar Inc., Deerfield, IL (US)

(72) Inventor: Todd Kabrich, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/148,623

(22) Filed: Oct. 1, 2018

(51) Int. Cl.
*F02M 21/02* (2006.01)
*F02M 37/00* (2006.01)
*F02D 41/14* (2006.01)

(52) U.S. Cl.
CPC ..... *F02M 37/0023* (2013.01); *F02D 41/1401* (2013.01); *F02D 2200/0602* (2013.01); *F02D 2200/0606* (2013.01); *F02D 2200/0614* (2013.01)

(58) Field of Classification Search
CPC ............. F02M 37/0023; F02M 21/023; F02M 21/0236; F02M 21/0239; F02M 21/0242; F02D 41/1401; F02D 2200/0614; F02D 2200/0602; F02D 2200/0606
USPC ........ 701/107, 112; 123/457, 458, 510, 511, 123/529, 198 D, 198 DB; 73/114.42, 73/114.43
See application file for complete search history.

(56) References Cited

U.S. PATENT DOCUMENTS

| | | | |
|---|---|---|---|
| 2,919,714 A | 1/1960 | Mrazek | |
| 3,244,002 A | 4/1966 | Prono | |
| 4,718,229 A * | 1/1988 | Riley | F02C 7/25 60/39.281 |
| RE37,617 E | 4/2002 | Sherman | |
| 6,725,731 B2 | 4/2004 | Wiklund et al. | |
| 6,923,074 B2 | 8/2005 | Cipolla et al. | |
| 7,422,028 B2 | 9/2008 | Nugent et al. | |
| 7,591,253 B2 * | 9/2009 | Martindale | F02D 19/081 123/27 GE |
| 8,192,172 B2 | 6/2012 | Baker et al. | |
| 8,215,284 B2 | 7/2012 | Suzuki et al. | |
| 9,175,614 B2 | 11/2015 | Hoefer et al. | |
| 9,506,787 B2 | 11/2016 | Postberg et al. | |
| 9,638,135 B2 | 5/2017 | LaMarr, Jr. et al. | |
| 2005/0127317 A1 | 6/2005 | Rebello | |

(Continued)

FOREIGN PATENT DOCUMENTS

| EP | 0767895 B1 | 1/1999 |
|---|---|---|
| JP | 3338574 B2 | 10/2002 |
| WO | 2017174309 A1 | 10/2017 |

OTHER PUBLICATIONS

U.S. Appl. No. 16/274,754, filed Feb. 13, 2019, Kabrich, Todd R., entitled "System for Shutting-Off Fluid Flow and Measuring Fluid Flow Rate", 33 pages.

*Primary Examiner* — Hai H Huynh
(74) *Attorney, Agent, or Firm* — Harrity & Harrity LLP

(57) ABSTRACT

A multi-position GSOV and control of the multi-position GSOV are disclosed. An example method may include determining a value of a parameter associated with a fuel train, wherein the fuel train is associated with an engine; determining a setting associated with the parameter; and causing, based on the value of the parameter and the setting, a position of a gas shut-off valve (GSOV) of the fuel train to be reconfigured to cause a flow rate of fuel flowing through the GSOV to change from a first flow rate to a second flow rate, wherein the second flow rate is greater than a zero percent flow rate and less than a one hundred percent flow rate.

20 Claims, 4 Drawing Sheets

(56) References Cited

U.S. PATENT DOCUMENTS

2006/0097214 A1    5/2006   Rebello
2014/0137663 A1    5/2014   Evans et al.
2017/0090485 A1    3/2017   Ohashi et al.

* cited by examiner

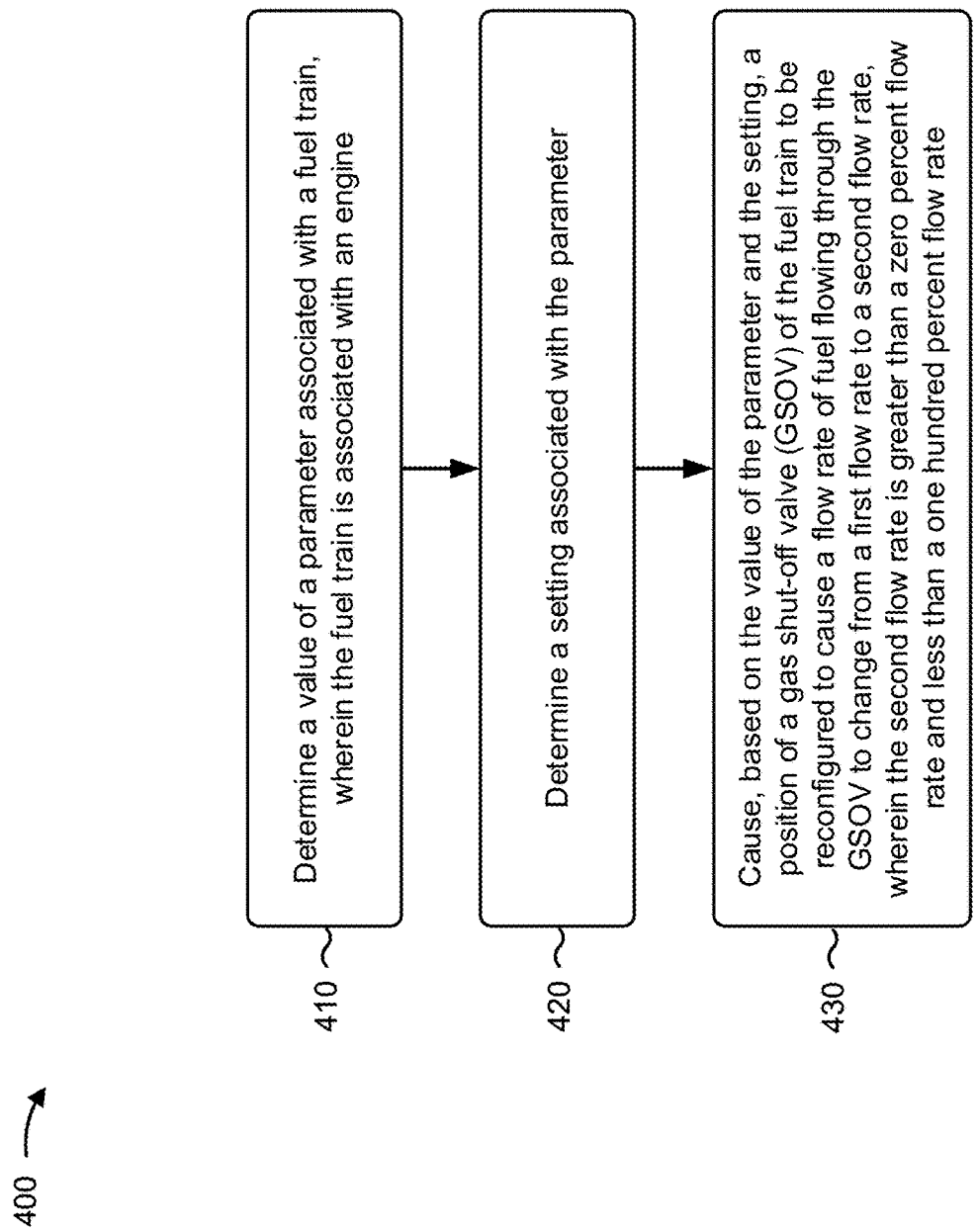

FUEL TRAIN CONTROL USING A MULTI-POSITION GAS SHUT-OFF VALVE

TECHNICAL FIELD

The present disclosure relates generally to gas shut-off valves (GSOVs) and, more particularly, to fuel train control using a multi-position GSOV.

BACKGROUND

Gas shut-off valves (GSOVs) may be placed within a fuel train of an engine. The fuel train provides fuel to combustion chambers (or cylinders) of an engine. The GSOVs may enable or prevent gas (or fuel) from flowing through the fuel train. For example, in an off position, the GSOV may be closed, preventing fuel from flowing through the fuel train, and, in an on position, the GSOV may be open, allowing the fuel to flow through the fuel train. The fuel train may include the GSOV, a fuel filter, a pressure regulator, and/or one or more fuel valves.

In some instances, the GSOV may be controlled by an engine control module (ECM) or other control circuit. The ECM may open and/or close the GSOV according to certain operating conditions of the engine.

One attempt to control a GSOV is disclosed in U.S. Pat. No. 9,638,135 that issued to LaMarr, Jr. et al. on May 2, 2017 ("the '135 patent"). In particular, the '135 patent discloses a fuel shut-off solenoid system. In the '135 patent, a fuel system includes a fluid passage, a solenoid, a valve, a driver circuit, and a control circuit. The driver circuit and the control circuit provide a first magnitude of power to the solenoid to initially change the solenoid from its closed position to its open position and a second magnitude of power to maintain the solenoid in its open position wherein the second magnitude of power is less than the first magnitude of power.

While the system of the '135 patent may enable control of fuel through the fuel train, the solenoid of the system enables only a full open position (allowing 100% possible fuel flow through the solenoid) or a full closed position (allowing 0% fuel flow through the solenoid) and cannot variably control a flow rate of fuel through the fuel train.

The multi-position GSOV and/or control of the multi-position GSOV of the present disclosure solves one or more of the problems set forth above and/or other problems in the art.

SUMMARY

According to some implementations described herein, the present disclosure is related to determining a value of a parameter associated with a fuel train, wherein the fuel train is associated with an engine; determining a setting associated with the parameter; and causing, based on the value of the parameter and the setting, a position of a gas shut-off valve (GSOV) of the fuel train to be reconfigured to cause a flow rate of fuel flowing through the GSOV to change from a first flow rate to a second flow rate, wherein the second flow rate is greater than a zero percent flow rate and less than a one hundred percent flow rate.

According to some implementations described herein, the present disclosure is related to obtaining a setting associated with a parameter of a component of a fuel train; determining that a value of the parameter is outside a threshold range of the setting; determining a position of a gas shut-off valve (GSOV) of the fuel train; and adjusting the position of the GSOV until the value of the parameter is within the threshold range of the setting, wherein the position of the GSOV is to be adjusted to increase or decrease a flow rate of fuel through the GSOV.

According to some implementations described herein, the present disclosure is related to a system that includes a gas shut-off valve (GSOV) that includes an electrically controlled actuator and a ball valve; and an engine control module to: receive a value of a parameter based on one or more measurements from the one or more sensors; obtain a setting associated with the parameter, wherein the setting and the parameter are associated with one of the one or more components of the fuel train; compare the value of the parameter and the setting associated with the parameter; and cause the electrically controlled actuator to adjust a position of the ball valve based on a result of comparing the value of the parameter and the setting associated with the parameter, wherein adjusting the position of the ball valve increases or decreases a flow rate of fuel through the GSOV.

BRIEF DESCRIPTION OF THE DRAWINGS

FIG. 4 is a flow chart of an example process for controlling fuel flow through a fuel train using a multi-position gas shut-off valve.

DETAILED DESCRIPTION

This disclosure related to a multi-position gas shut-off valve (GSOV) of a fuel train that provides fuel to one or more combustion chambers or cylinders of an engine. The multi-position GSOV has universal applicability to any machine utilizing such a GSOV within a fuel train. The term "machine" may refer to any machine that performs an operation associated with an industry such as, for example, mining, construction, farming, transportation, or any other industry. As some examples, the machine may be a pump, a compressor, a generator, a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground or underground equipment, and/or any machine or device that utilizes an engine with a GSOV.

Figure 1:
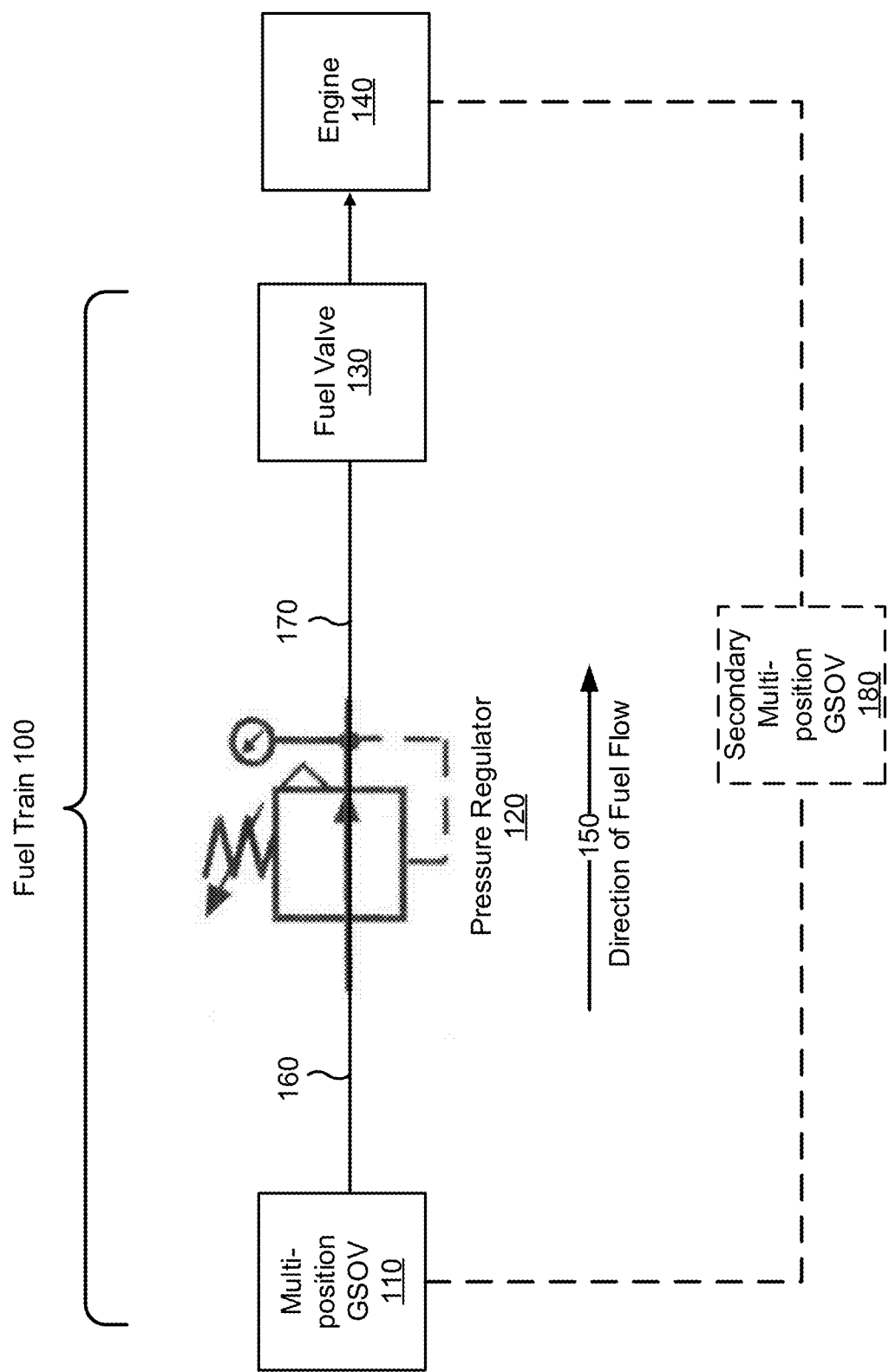
FIG. 1 is diagram of an example fuel train described herein.

FIG. 1 is a diagram of an example fuel train 100 described herein. The example fuel train 100 includes a multi-position GSOV 110, a pressure regulator 120, and a fuel valve 130. In some implementations, fuel train 100 may include a fuel filter (e.g., between multi-position GSOV 110 and pressure regulator 120). The example fuel train 100 provides fuel to an engine 140 (e.g., an internal combustion engine). In some implementations, the fuel train 100 may provide fuel to one or more combustion chambers (or cylinders) of engine 140. Accordingly, fuel train 100 of FIG. 1 may be one of a plurality of fuel trains providing fuel to engine 140. Additionally, or alternatively, there may be a plurality of branches of fuel train 100 to one or more other components of fuel train 100, such that there may be multiple multi-position GSOVs 110, multiple pressure regulators 120, and/or multiple fuel valves 130. In some implementations, a plurality of multi-position GSOVs 110 may be placed in series (e.g., to have one or more of the plurality of multi-position GSOVs serve as a backup to the others).

According to some implementations, the multi-position GSOV 110 may be controlled (e.g., via an engine control module (ECM)) to increase or decrease a flow rate of fuel and/or a pressure of fuel that is flowing through each component of fuel train 100 to engine 140.

As shown in FIG. 1, a direction of the flow of fuel 150 goes from the multi-position GSOV 110, then through pressure regulator 120, and finally through fuel valve 130 before being injected into engine 140 for combustion. Accordingly, as described herein, the multi-position GSOV 110 may be upstream from pressure regulator 120 and fuel valve 130 relative to the direction of the flow of fuel 150 through fuel train 100. On the other hand, fuel valve 130 may be downstream from multi-position GSOV 110 and pressure regulator 120 relative to the direction of the flow of fuel 150. According to some implementations, because multi-position GSOV 110 is placed upstream from other components of fuel train 100, multi-position GSOV 110 may have control (e.g., based on instructions from an ECM) over one or more amounts of fuel, a pressure associated with the fuel, and/or a flow rate of fuel that flows through one or more components (e.g., a fuel filter, pressure regulator 120, fuel valve 130, and/or the like) of fuel train 100. Furthermore, when multi-position GSOV 110 is upstream from all other components of fuel train 100, multi-position GSOV 110 may be able to increase or decrease a turndown ratio of fuel train 100. As such, when multi-position GSOV 110 is placed upstream from all other components of fuel train 100, the multi-position GSOV 110 may have partial to full authority of any downstream component.

As shown in FIG. 1, an inlet pressure 160 of pressure regulator 120 and an outlet pressure 170 of the pressure regulator 120 can be monitored. For example, one or more sensors (e.g., temperature sensors, pressure sensors, and/or the like) may be configured to determine inlet pressure 160 and outlet pressure 170. Accordingly, a differential pressure (DP) for pressure regulator 120 can be determined from inlet pressure 160 and outlet pressure 170. As such, if the DP for pressure regulator 120, as sensed by the one or more sensors sensing inlet pressure 160 and outlet pressure 170, does not match a configuration and/or setting of pressure regulator 120 (e.g., the parameter is outside of a threshold range of the setting), an ECM may instruct multi-position GSOV 110 to increase or decrease the flow rate of fuel through multi-position GSOV 110. In such cases, multi-position GSOV 110 may adjust a position (e.g., a position of a valve, such as a ball valve, a spool valve, a needle valve, or any other type of valve with shut off capability) of multi-position GSOV 110 to enable the flow rate of fuel through multi-position GSOV 110 to be increased or decreased. One or more other parameters, other than inlet pressure 160 and outlet pressure 170, associated with the fuel flowing through fuel train 100 and/or operating conditions of fuel train 100 or engine 140 may be monitored and/or used to control the flow rate of fuel using the multi-position GSOV 110, as described herein. In some implementations, inlet pressure 160 of pressure regulator 120 may correspond to an outlet pressure of multi-position GSOV 110. Additionally, outlet pressure 170 of pressure regulator 120 may correspond to an inlet pressure pressure of fuel valve 130.

In some implementations, multi-position GSOV 110 enables a variable flow rate of fuel through multi-position GSOV 110. For example, multi-position GSOV 110 may enable an adjustment from a first flow rate that is between zero flow and maximum flow to and/or from a second flow rate that is between zero flow and/or maximum flow. As more specific examples, multi-position GSOV 110 may be configured to increase or decrease a flow rate of fuel to and/or from 20% of maximum flow rate, to and/or from 30% of maximum flow rate, to and/or from 50% of maximum flow rate, to and/or from 75% of maximum flow rate, and/or the like. In such cases, the flow rate of the fuel through the multi-position GSOV 110 may depend on the position of the valve of the multi-position GSOV 110 as controlled by an ECM (e.g., via an electrically controlled actuator). Accordingly, the multi-position GSOV 110 may enable additional flow rates of fuel through fuel train 100 other than zero flow (0% of maximum flow rate) or maximum flow (100% of maximum flow rate), though multi-position GSOV 110 may enable zero flow and/or maximum flow of fuel.

In some implementations, one or more multi-position GSOVs, similar to multi-position GSOV 110, may be configured in parallel to one or more components of fuel train 100. For example, a second multi-position GSOV may be configured in parallel to fuel valve 130. In such cases, the second multi-position GSOV may be used to control an amount of fuel, a pressure of fuel, and/or a flow rate of fuel directly injected into engine 140. The second multi-position GSOV may be used under certain operating conditions (e.g., upon startup of engine 140) as determined by an ECM associated with engine 140.

In some implementations, a secondary multi-position GSOV 180 may be included in parallel to multi-position GSOV 110, pressure regulator 120, and fuel valve 130 of fuel train 100. Secondary multi-position GSOV 180 may enable full authority over fuel train 100 during a startup condition. In such cases secondary multi-position GSOV 180 may be used to get engine 140 started. Once started, controls may switch over to multi-position GSOV 110 during operation of engine 140.

As indicated above, FIG. 1 is provided as an example. Other examples are possible and may differ from what was described in connection with FIG. 1.

Figure 2:
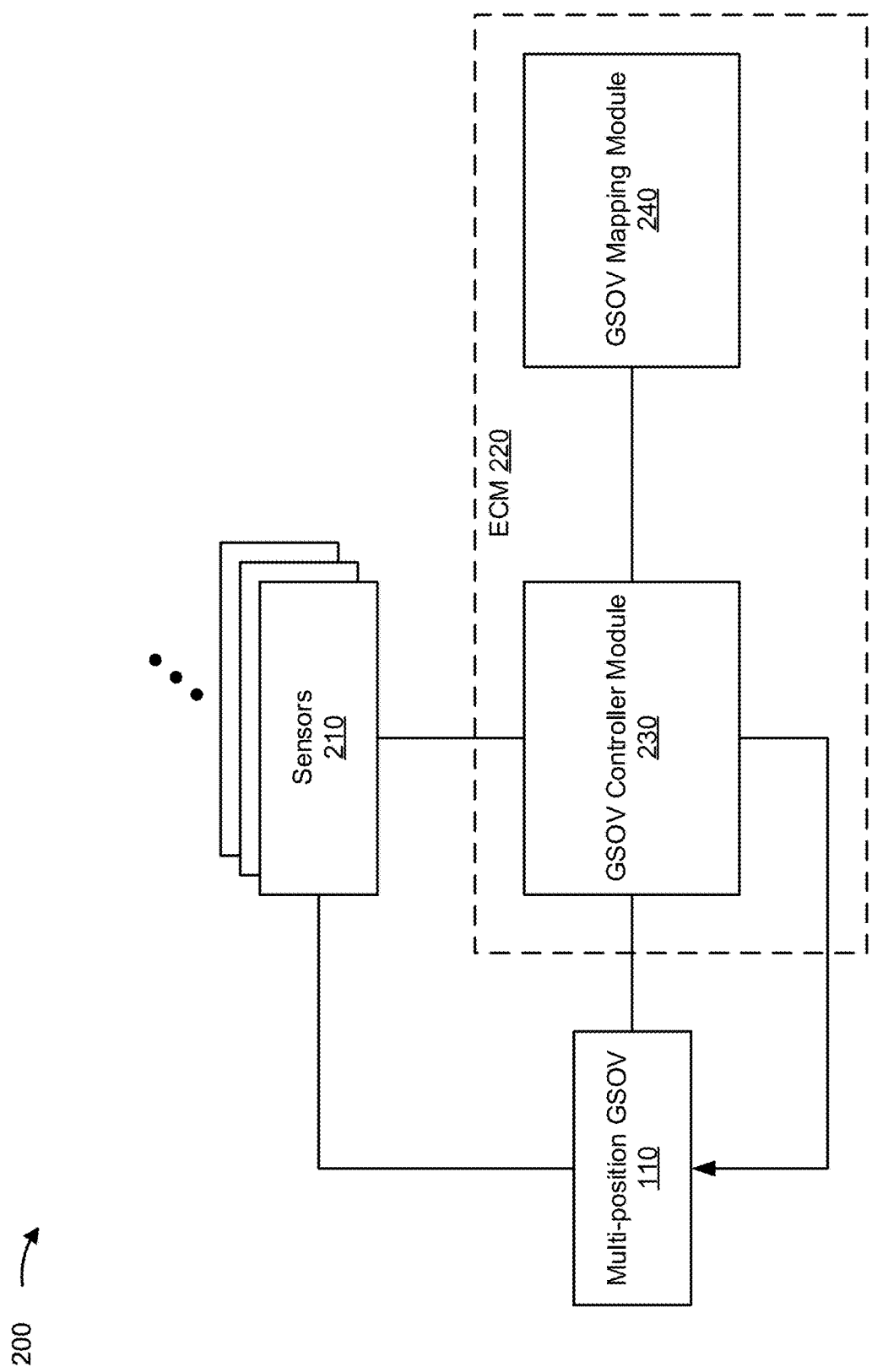
FIG. 2 is a diagram of an example fuel train control system, described herein.

FIG. 2 is a diagram of an example fuel train control system (referred to herein as "system 200"), described herein. As shown in FIG. 2, system 200 may include multi-position GSOV 110, one or more sensors 210 (referred to individually as "sensor 210," and collectively as "sensors 210"), and an ECM 220. As further shown in FIG. 2, ECM 220 includes a GSOV controller module 230 and a GSOV mapping module 240. Devices of system 200 may interconnect via wired connections, wireless connections, or a combination of wired and wireless connections.

As mentioned above, multi-position GSOV 110 may include one or more devices configured to control a flow rate of fuel through fuel train 100. As described herein, multi-position GSOV 110 may be controlled by ECM 220. For example, a position of multi-position GSOV 110 (e.g., a position of a valve, such as a ball valve, of multi-position GSOV 110) may be controlled or adjusted according to one or more instructions from ECM 220.

Sensors 210 may include any type of sensor configured to measure one or more parameters of fuel train 100 and/or engine 140. Sensors 210 may be sensors of a sensor system that is communicatively coupled with ECM 220, as described herein. For example, sensors 210 may include temperature sensors (e.g., to detect temperature of fuel, air, exhaust, a component, coolant, and/or the like), position sensors (e.g., to detect a position of a valve, an actuator, an engine part (e.g., a piston), and/or the like), speed sensors (e.g., to detect an engine speed, a machine speed, and/or the like), pressure sensors (e.g., to detect a measure of compression of air or fuel in fuel train 100), emissions sensors (e.g., to detect emission levels of engine 140), combustion sensors, and/or the like.

Sensor 210 may be associated with a sensing parameter that may be used in determining a flow rate of fuel, a pressure of fuel, mass flow of fuel, and/or the like associated with fuel train 100, as described herein. For example, a value of the sensing parameter for sensor 210 may represent or indicate a measurement of the sensor 210, such as a measured pressure of a pressure sensor, a measured temperature of a temperature sensor, a measured timing of a valve (e.g., fuel valve 130) opening and/or closing by a position sensor, a measured speed of an engine (e.g., engine 140) by a speed sensor, a measured position of an actuator or valve (e.g., a valve of multi-position GSOV 110, fuel valve 130, and/or the like) by a position sensor, measured emissions by an emissions sensor, and/or the like.

ECM 220, as described herein, provides control of multi-position GSOV 110 in order to control a flow rate of fuel through fuel train 100 and/or through various components of fuel train 100 according to one or more measurements from sensors 210. ECM 220 is implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, ECM 220 includes one or more processors capable of being programmed to perform a function. In some implementations, one or more memories, including a random-access memory (RAM), a read only memory (ROM), and/or another type of dynamic or static storage device (e.g., a flash memory, a magnetic memory, and/or an optical memory) may store information and/or instructions for use by ECM 220. In some implementations, ECM 220 may include a memory (e.g., a non-transitory computer-readable medium) capable of storing instructions, that when executed, cause the processor to perform one or more processes and/or methods described herein. A computer-readable medium is defined herein as a non-transitory memory device. A memory device includes memory space within a single physical storage device or memory space spread across multiple physical storage devices.

ECM 220 may execute the instructions to perform various control functions and processes to control multi-position GSOV 110, and, as such, to automatically control a flow rate of fuel through fuel train 100 and/or through various components of fuel train 100. ECM 220 may include any appropriate type of engine control system configured to perform engine control functions such that engine 140 may operate properly. Further, ECM 220 may also control other systems of a machine, such as transmission systems, hydraulics systems, and/or the like.

In operation, computer software instructions may be stored in or loaded to ECM 220. ECM 220 may execute the computer software instructions to perform various control functions and processes to multi-position GSOV 110 and to automatically adjust one or more parameters of fuel train 100, such as an inlet pressure of a pressure regulator, a pressure, a mass flow of fuel through the fuel train, and/or the like. Additionally, or alternatively, ECM 220 may execute computer software instructions to generate and/or cause sensors 210 to provide fuel train and/or engine temperature values, fuel train and/or engine pressure values, engine emission values, engine speed values, actuator or valve position values, and/or other parameter values used to monitor and/or fuel train 100 and/or engine 140.

The ECM 220 may also identify, obtain, and/or determine parameters that are associated with conditions (e.g., as sensed by sensors 210) or settings corresponding to the operations of fuel train 100 and/or engine 140, such as fuel rate or quantity, engine speed, fuel injection timing, intake manifold temperature (IMAT), intake manifold pressure (IMAP), intake valve actuation (IVA), IVA timing, intake throttle valve position, air injection pressure, fuel injection pressure, torque delivered by engine 140, total fuel injection quantity, exhaust pressure, oxygen/fuel molar ratio, ambient temperature, ambient pressure (e.g., barometric pressure), mass flow through fuel train 100, exhaust backpressure valve position, coolant temperature, and/or the like.

As shown in FIG. 2, ECM 220 includes a GSOV controller module 230 and a GSOV mapping module 240. The GSOV controller module 230 may be used to control multi-position GSOV 110 according to one or more mappings of GSOV mapping module 240. As described herein, GSOV controller module 230 may adjust the position of multi-position GSOV 110 via a signal and/or instructions to an electrically controlled actuator of multi-position GSOV 110 to change positions. Based on the signal and/or instructions, the electrically controlled actuator of multi-position GSOV 110 may pivot and/or rotate a valve (e.g., a ball valve) of multi-position GSOV 110 to a corresponding position. Additionally, or alternatively, the multi-position GSOV 110 may include a controller (e.g., a device that includes a processor, a memory, and/or the like similar to ECM 220) that is capable of controlling multi-position GSOV 110 separately from ECM 220. Accordingly, the multi-position GSOV 110 may serve as a slave control module, capable of operating the multi-position GSOV according to information from sensors 210, and the ECM 220 may serve as a master control module capable of configuring the control module of to control multi-position GSOV 110.

GSOV controller module 230 may include one or more devices configured to control multi-position GSOV 110, as described herein. GSOV controller module 230 may be configured, via a user interface and/or default settings, to control a flow rate of fuel through multi-position GSOV 110 according to one or more parameters and/or settings of fuel train 100. For example, GSOV controller module 230 may determine a position of multi-position GSOV 110 (e.g., a position at which multi-position GSOV is currently set, a position at which multi-position GSOV 110 is to be set, and/or the like) and/or adjust the position of the multi-position GSOV 110 to control the flow rate of fuel through multi-position GSOV 110 and/or one or more other components of fuel train 100.

GSOV controller module 230, according to some implementations, is configured to identify one or more parameters of fuel train 100 and/or one or more operating of conditions of engine 140. In some implementations, the GSOV controller module 230 may determine the one or more parameters and/or one or more operating conditions based on measurements received from sensors 210.

As used herein, a parameter may correspond to a value that is sensed by one or more of sensors 210 (e.g., a temperature value, a pressure value, a position value, and/or the like) and a setting may correspond to a desired configuration (e.g., according to a user input and/or design of fuel train 100 or engine 140) of a particular component, a particular parameter, and/or the like. In some implementations, GSOV controller module 230 may adjust a position of multi-position GSOV 110 to increase or decrease a flow rate of fuel through multi-position GSOV 110 if a parameter associated with a component of fuel train 100 does not match a corresponding setting (e.g., the value of the parameter is outside of a threshold range of the setting) for the component of fuel train 100.

For example, GSOV controller module 230 may be configured to adjust a pressure of fuel as it enters one or more components of fuel train 100. For example, the GSOV controller module 230, based on inlet pressure 160 and/or outlet pressure 170 of pressure regulator 120, may determine the flow rate of fuel through pressure regulator 120. In some implementations, GSOV controller module 230 may determine whether the flow rate matches and/or substantially matches (e.g., within a manufacturing or industry tolerance) a setting for the flow rate through pressure regulator 120. In such cases, if the flow rate (or other parameter, such as pressure, of pressure regulator 120) does not match the setting, GSOV controller module 230 may increase (e.g., if the flow rate of fuel is too slow) or decrease (e.g., if the flow rate of fuel is too high) the flow rate through multi-position GSOV 110. In such cases, because multi-position GSOV 110 may be upstream from pressure regulator 120, relative to the direction of the flow of fuel through fuel train 100, the adjusted position of multi-position GSOV 110 affects the flow rate of fuel through pressure regulator 120. The adjustment to multi-position GSOV 110 correspondingly affects the flow rate through pressure regulator 120 according to the flow rate of fuel through multi-position GSOV 110 as allowed by the position of multi-position GSOV 110. In some implementations a differential pressure may be determined across one or more of the components of fuel train 100. The differential pressure may be used to adjust the pressure of fuel at one or more of the components.

In some implementations, multi-position GSOV 110 may determine an adjustment to the position of multi-position GSOV 110 according to one or more operating conditions of engine 140. For example, adjustments to multi-position GSOV 110 may vary according to certain operating conditions of engine 140. For example, if GSOV controller module 230 determines that an adjustment is to be made to the position of multi-position GSOV 110 (e.g., based on a difference between a measured parameter and a setting corresponding to the parameter), the change in the position of the multi-position GSOV 110 may be different under different operating conditions of engine 140. More specifically, a different adjustment may be made to the multi-position GSOV 110 if the engine 140 is under a startup operation versus if the engine 140 is warmed up (e.g., as determined by a temperature of engine 140 and/or a runtime of engine 140 obtained via sensors 210). In some implementations, GSOV controller module 230 may determine whether a position of multi-position GSOV 110 is to be adjusted based on obtaining an operating condition of engine 140 and/or detecting a change to an operating condition of engine 140. For example, once GSOV controller module 230 determines that engine 140 is warmed up after a startup operation, GSOV controller module 230 may adjust the position of multi-position GSOV 110 to increase a flow rate of fuel through multi-position GSOV 110 and/or through fuel train 100.

In some implementations, GSOV controller module 230 may use a mapping of parameters, settings, and/or operating conditions of fuel train 100 and/or engine 140 to determine a position and/or an adjustment to the position (e.g., a change of a particular degree of the position of the valve that corresponds to a change of a particular percentage of a flow rate) of multi-position GSOV 110. Additionally, or alternatively, GSOV controller module 230 may iteratively compare a parameter and a setting associated with the parameter and incrementally adjust the position of multi-position GSOV 110 to increase or decrease a flow rate of fuel through multi-position GSOV 110 until the parameter and the setting are within a threshold range of one another (e.g., according to a manufacturing or industry tolerance). Accordingly, between iterations, GSOV controller module 230 may determine that an adjustment from a first position of the multi-position GSOV 110 to a second position of the multi-position GSOV 110 brought the parameter value with a threshold range of the setting.

GSOV mapping module 240 may be any suitable data structure (e.g., a database, a table, an index, a graph, and/or the like) that may store parameters values associated with sensors 210 and/or settings of corresponding parameters and/or components of fuel train 100 that are mapped to positions and/or adjustments to positions of multi-position GSOV 110. GSOV mapping module 240 may be updated and/or populated with empirical data found in association with positions of multi-position GSOV 110, with adjustments to multi-position GSOV 110, and/or the like. For example, a mapping may indicate a position at which a ball valve of multi-position GSOV 110 is to be set when there is a difference between a parameter (e.g., a pressure, a flow rate of fuel, and/or the like) and a setting associated with the parameter. Further, the mapping may map the difference, and/or the values of the parameter and/or setting to a position based on operating conditions of fuel train 100 and/or engine 140. In some implementations, GSOV mapping module 240 may obtain and/or use mappings maintained by GSOV mapping module 240 to control multi-position GSOV 110 and/or a flow of fuel through fuel train 100, as described herein. For example, mappings in the GSOV mapping module 240 may be used as input values to determine a position of multi-position GSOV 110 is to be made based on the mapping.

Therefore, GSOV mapping module 240 may maintain and/or include a plurality of tables, mappings, and/or the like that correspond to a variety of measurements associated with sensors 210 and/or settings associated with fuel train 100 and/or engine 140. Accordingly, depending on operating conditions of fuel train 100 and/or engine 140, different mappings may be used to adjust a position of multi-position GSOV 110 (e.g., a position of a ball valve of multi-position GSOV 110).

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
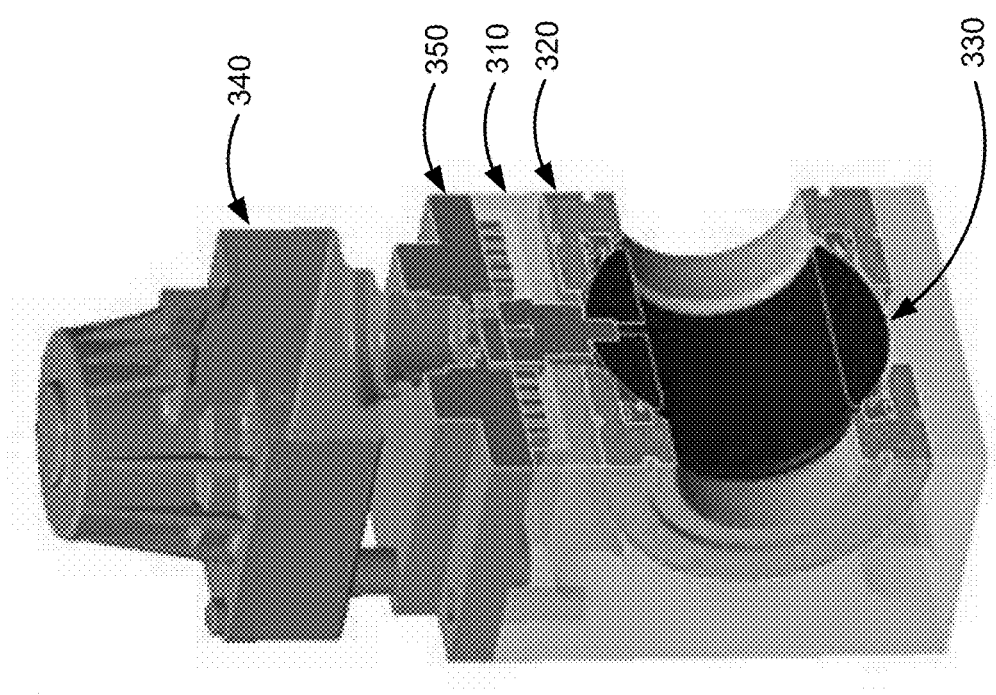
FIG. 3 is diagram of an example multi-position GSOV, described herein.

FIG. 3 is a diagram of an example multi-position GSOV 110, described herein. The example multi-position GSOV 110 of FIG. 3 includes a support structure 310, a fuel line seal 320, a ball valve 330, an electrically controlled actuator 340, and an actuator mount 350.

As shown in FIG. 3, the support structure 310 holds fuel line seal 320. The fuel line seal 320 may be configured against ball valve 330 according to a torque capability of electrically controlled actuator 340 to adjust a position of ball valve 330. The torque requirement may depend on the diameter of a fuel line of the fuel train, a tightness of fuel line seal 320 to ball valve 330, an amount of expected pressure within the fuel train, and/or the like. In some implementations, the fuel line seal 320 may have a 2 inch diameter, a 3 inch diameter, and/or the like. Further, ball valve 330 may be a spherically-shaped ball with an opening that has a corresponding 2 inch diameter, 3 inch diameter, and/or the like. Accordingly, the position of ball valve 330 relative to fuel line seal 320 may determine a flow rate of fuel through multi-position GSOV 110. Furthermore, the flow rate of fuel through multi-position GSOV 110 may depend on an inlet pressure at multi-position GSOV 110, an outlet pressure at multi-position GSOV 110, and a temperatures of multi-position GSOV 110. The ball valve 330 may enable maximum flow through multi-position GSOV 110 and fuel line seal 320 when ball valve 330 is in a fully open position (shown in FIG. 3). When ball valve 330 is in a fully closed position, fuel may be prevented from flowing through multi-position GSOV 110 and/or fuel line seal 320. Furthermore, ball valve 330 may be partially opened to enable between greater than zero fuel flow (e.g., 0% flow) and/or less than maximum flow (e.g., 100% flow). For example, ball valve 330 may be positioned (e.g., based on instructions from ECM 220) to allow 20% flow, 50% flow, 75% flow, and/or the like.

Electrically controlled actuator 340 is mounted to support structure 310 via actuator mount 350. Further, electrically controlled actuator 340 may be mechanically connected to ball valve 330. For example, an axel of electrically controlled actuator 340 may be connected to, fixed to, or formed as part of a pole of ball valve 330. Further, electrically controlled actuator 340 may be communicatively coupled with ECM 220. Based on instructions (e.g., received via a signal) from the ECM 220, the electrically controlled actuator 340 may adjust the position of ball valve 330 to increase or decrease a flow rate of fuel flowing through multi-position GSOV 110.

In some implementations, an opening in either side of ball valve 330 (determined by the position of ball valve 330 relative to fuel line seal 320) may correspond to a percentage of flow that is enabled by the position of ball valve 330 as controlled by electrically controlled actuator 340. For example, electrically controlled actuator 340 may enable an opening in either side of the ball valve that has a size corresponding to a percentage flow rate through multi-position GSOV 110. For example, if the opening formed by ball valve 330 and fuel line seal 320 is 50% of a cross-sectional area of a fuel line through multi-position GSOV 110, 50% of maximum fuel flow may be provided through multi-position GSOV 110. Furthermore, electrically controlled actuator 340 and/or ECM 220 may use a mapping of the fuel flow rate to the position of ball valve 330 relative to fuel line seal 320. The position of ball valve 320 relative to the fuel line seal 320 may be defined by an angle of rotation of ball valve 330 within multi-position GSOV 110. Furthermore, as described herein, a position of multi-position GSOV 110 may correspond to the position of ball valve 330.

As indicated above, FIG. 3 is provided as an example. Other examples are possible and may differ from what was described in connection with FIG. 3.

FIG. 4 is a flow chart of an example process 400 for controlling fuel flow through a fuel train using a multi-position GSOV. In some implementations, one or more process blocks of FIG. 4 may be performed by an ECM (e.g., ECM 220). In some implementations, one or more process blocks of FIG. 4 may be performed by another device or a group of devices separate from or including the ECM, such as a multi-position GSOV (e.g., multi-position GSOV 110) or one or more sensors (e.g., sensors 210).

As shown in FIG. 4, process 400 may include determining a value of a parameter associated with a fuel train, wherein the fuel train is associated with an engine (block 410). For example, the ECM (e.g., using GSOV controller module 230, and/or the like) may determine a value of a parameter associated with a fuel train, as described above. In some implementations, the fuel train is associated with an engine.

As further shown in FIG. 4, process 400 may include determining a setting associated with the parameter (block 420). For example, the ECM, (e.g., using GSOV controller module, and/or the like) may determine a setting associated with the parameter, as described above.

As further shown in FIG. 4, process 400 may include causing, based on the value of the parameter and the setting, a position of a gas shut-off valve (GSOV) of the fuel train to be reconfigured to cause a flow rate of fuel flowing through the GSOV to change from a first flow rate to a second flow rate, wherein the second flow rate is greater than a zero percent flow rate and less than a one hundred percent flow rate (block 430). For example, the ECM, (e.g., using GSOV controller module 230, GSOV mapping module 240, and/or the like) may causing, based on the value of the parameter and the setting, a position of a gas shut-off valve (GSOV) of the fuel train to be reconfigured to cause a flow rate of fuel flowing through the GSOV to change from a first flow rate to a second flow rate, as described above. In some implementations, the second flow rate is greater than a zero percent flow rate and less than a one hundred percent flow rate.

Process 400 may include additional implementations, such as any single implementation or any combination of implementations described below and/or in connection with one or more other processes described elsewhere herein.

In some implementations, the ECM may determine the position of the GSOV is at a first position that enables the fuel to flow through the GSOV at a first flow rate. In some implementations, the ECM, when adjusting the position of the GSOV, may adjust the position of the GSOV to a second position that enables fuel to flow through the GSOV at a second flow rate. In some implementations, the second flow rate is different than the first flow rate In some implementations, adjusting the position of the GSOV increases or decreases a fuel turndown ratio of the fuel train. In some implementations, the ECM may determine a difference between the setting and the value of the parameter; obtain one or more operating conditions associated with the engine; and use a mapping of the difference and the one or more operating conditions to candidate positions of the GSOV to determine the position.

In some implementations, the GSOV is upstream, relative to a flow of the fuel through the fuel train, from a sensor associated with the parameter. In some implementations, the parameter includes at least one of an inlet pressure of a pressure regulator of the fuel train; a pressure of the fuel train; or a mass flow of fuel through the fuel train. In some implementations, the GSOV comprises an electrically controlled actuator and a ball valve. In some implementations, the electrically controlled actuator is configured to mechanically control a position of the ball valve Additionally, or alternatively a process may include obtaining a setting associated with a parameter of a component of a fuel train. For example, the ECM, (e.g., using GSOV controller module 230, and/or the like) may obtain a setting associated with a parameter of a component of a fuel train, as described above.

Such a process may include determining that a value of the parameter is outside a threshold range of the setting. For example, the ECM, (e.g., using GSOV controller module 230, GSOV mapping module 240, and/or the like) may determine that a value of the parameter is outside a threshold range of the setting, as described above.

Such a process may include determining a position of a gas shut-off valve (GSOV) of the fuel train. For example, the ECM, (e.g., using GSOV controller module 230, GSOV mapping module 240, and/or the like) may determine a position of a gas shut-off valve (GSOV) of the fuel train, as described above.

Such a process may include adjusting the position of the GSOV until the value of the parameter is within the threshold range of the setting, as described above, wherein the position of the GSOV is to be adjusted to increase or decrease a flow rate of fuel through the GSOV. For example, the ECM, (e.g., using GSOV controller module 230, GSOV mapping module 240, and/or the like) may adjust the position of the GSOV until the value of the parameter is within the threshold range of the setting, as described above. In some implementations, the position of the GSOV is to be adjusted to increase or decrease a flow rate of fuel through the GSOV.

Such a process may include additional implementations, such as any single implementation or any combination of implementations described below and/or in connection with one or more other processes described elsewhere herein.

In some implementations, the ECM, when adjusting the position of the GSOV until the value of the parameter is within the threshold range of the setting, may adjust the position of the GSOV from a first position to a second position and determine, when the GSOV is in the second position, that the value of the parameter is within the threshold range of the setting. In some implementations, the first position enables a different flow rate of the fuel through the GSOV than the second position.

In some implementations, the setting is based on one or more operating conditions of an engine associated with the fuel train. In some implementations, the component includes at least one of: the multi-position GSOV; another multi-position GSOV that is separate from the multi-position GSOV; a fuel filter; a pressure regulator; or a fuel valve.

In some implementations, the fuel train includes one or more fuel valves downstream from the GSOV, relative to the fuel flowing through the fuel train. In some implementations, the one or more fuel valves enable the fuel to be injected into one or more respective combustion chambers of an internal combustion engine. In some implementations, the setting is obtained based on one or more operating conditions of an engine of the fuel train.

In some implementations, the GSOV comprises an electrically controlled actuator and a ball valve. In some implementations, the electrically controlled actuator is configured to mechanically control a position of the ball valve and the position of the ball valve corresponds to the position of the GSOV.

Additionally, or alternatively a process may include receiving a value of a parameter based on one or more measurements from one or more sensors. For example, the ECM, (e.g., using GSOV controller module 230, and/or the like) may receive a value of a parameter based on one or more measurements from one or more sensors, as described above.

Such a process may include obtaining a setting associated with the parameter, wherein the setting and the parameter are associated with one of one or more components of a fuel train. For example, the ECM, (e.g., using GSOV controller module 230, and/or the like) may obtain a setting associated with the parameter, as described above. In some implementations, the setting and the parameter are associated with one of the one or more components of the fuel train.

Such a process may include comparing the value of the parameter and the setting associated with the parameter. For example, the ECM, (e.g., using GSOV controller module 230, GSOV mapping module 240, and/or the like) may compare the value of the parameter and the setting associated with the parameter, as described above.

Such a process may include causing an electrically controlled actuator to adjust a position of a ball valve based on a result of comparing the value of the parameter and the setting associated with the parameter, wherein adjusting the position of the ball valve increases or decreases a flow rate of fuel through a GSOV. For example, the ECM, (e.g., using GSOV controller module 230, GSOV mapping module 240, and/or the like) may cause the electrically controlled actuator to adjust a position of the ball valve based on a result of comparing the value of the parameter and the setting associated with the parameter, as described above. In some implementations, adjusting the position of the ball valve increases or decreases a flow rate of fuel through the GSOV.

Such a process may include additional implementations, such as any single implementation or any combination of implementations described below and/or in connection with one or more other processes described elsewhere herein.

In some implementations, the ECM may determine a first position of the ball valve based on information received from the electrically controlled actuator and, when causing the electrically controlled actuator to adjust the position of the ball valve, cause the electrically controlled actuator to adjust the position of the ball valve from the first position to a second position. In some implementations, a flow rate of fuel flowing through the ball valve in the first position is different than a flow rate of the fuel flowing through the ball valve in the second position.

In some implementations, the GSOV is configured within the fuel train to be upstream from the one or more sensors, relative to a flow of fuel through the fuel train. In some implementations, the one or more sensors are configured to measure a plurality of parameters associated with at least one of a fuel filter, a pressure regulator, or a fuel valve of the fuel train. In some implementations, the parameter is one of the plurality of parameters.

In some implementations, the ECM may, when comparing the value of the parameter and the setting associated with the parameter, determine whether the value of the parameter is outside a threshold range of the setting. The ECM may cause the electrically controlled actuator to adjust the position of the ball valve when the value of the parameter is outside of the threshold range of the setting.

In some implementations, the parameter may include at least one of an inlet pressure of a pressure regulator of the fuel train; a pressure of the fuel train; or a mass flow of fuel through the fuel train.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

In fuel train of an internal combustion engine, a gas shut-off valve (GSOV) may be implemented by an on/off device (e.g., a solenoid, a butterfly valve, and/or the like). Such an on/off device may be referred to herein as an on/off GSOV. In such a case, when the GSOV is on, a maximum flow rate of fuel may be enabled through the GSOV, and, when the GSOV is off, fuel may be prevented from flowing through the GSOV. Furthermore, switching from on to off (or vice versa) may occur substantially instantaneously. Accordingly, an on/off device used to implement a GSOV of an engine may allow either maximum fuel flow or zero (or substantially zero) fuel flow through the GSOV.

A multi-position GSOV (e.g., multi-position GSOV 110) and/or control of the multi-position GSOV by an ECM (e.g., ECM 220), as described herein, may enable variable fuel flow rates through a fuel train. In some implementations, the multi-position GSOV may be implemented via an electrically controlled actuator and a ball valve. Such a multi-position GSOV can be configured for use under low fuel pressure and/or high fuel pressure conditions while maintaining drive system robustness and avoiding engine startup issues, as described below.

In some instances, because an on/off GSOV goes from zero flow to maximum flow relatively instantaneously, an overshoot (e.g., of fuel) may occur within the fuel train. For example, depending on an amount of inlet pressure generated after the on/off GSOV is switched to open, a pressure regulator may not be able to shutoff (or adjust) in time to regulate the pressure of the fuel as designed, resulting in fuel leaks and/or other failures in the fuel train. Accordingly, a relatively high pressure (i.e., the outlet pressure of the pressure regulator or injection pressure of the fuel valve) may result that is outside of a range of the fuel valve. For example, if the pressure is configured to be 6 pounds per square inch (psi) (or 35 kiloPaschals (kPa)), the pressure may reach 30+ psi (or 150+ kPa), which is more than five times the setting of the pressure. Such conditions may cause damage to one or more components of the fuel train, engine, and/or machine using the on/off GSOV (e.g., via fuel leaks from the fuel train). The multi-position GSOV may be controlled by the ECM, as described herein, to allow fuel to reach the pressure regulator at a rate that allows the pressure regulator to pressurize the fuel according to the setting or design of the pressure regulator. For example, the ECM may set the multi-position GSOV to allow 50% flow, 30% flow, and/or the like (rather than maximum flow), such that the pressure regulator can pressurize the fuel within a threshold time period, but without allowing overshoot of the fuel through the pressure regulator and/or fuel valve. Accordingly, the multi-position GSOV and/or control of the multi-position GSOV, as described herein, can prevent overshoot within a fuel train of an engine.

In some instances, an on/off GSOV may inhibit an ability of an engine to start. For example, the on/off GSOV may provide too much fuel (e.g., because the on/off GSOV is on (providing maximum fuel flow) when an engine is cold) and/or not enough fuel (e.g., because the on/off GSOV is off (providing minimum fuel flow), and thus not providing fuel). As described herein, the multi-position GSOV may be controlled during startup of an engine to provide a sufficient amount of fuel to start the engine (without flooding the engine) until the engine is started and/or warmed up. Further, once the ECM determines that the engine is warmed up to a threshold level (e.g., running under threshold operating conditions (e.g., threshold temperatures, threshold pressures, and/or the like)), the ECM may instruct the multi-position GSOV to enable more fuel or a max flow of fuel through the multi-position GSOV.

According to some implementations, one or more multi-position GSOVs can be placed in parallel to one or more components of a fuel train. For example, a multi-position GSOV can be placed in parallel to a fuel valve of the fuel train. In such cases, the multi-position GSOV may be used in place of the fuel valve under certain operating conditions (e.g., during startup of the engine). Accordingly, the ECM may have full control of when fuel is injected and/or how much fuel is injected into one or more combustion chambers of an engine. Further, in such an example, a multi-position GSOV can be placed at the front end of the fuel train, enabling the ECM to have full control of the fuel flow (e.g., mass flow) though the fuel train.

Furthermore, in some instances, including a multi-position GSOV within a fuel train, as described herein, may enhance a turndown ratio of a fuel train. For example, if a typical fuel train has a turndown ratio of 20:1, then adding a multi-position GSOV (e.g., upstream from all other components of the fuel train) that has a 20:1 turndown ratio to the fuel train can provide up to a 400:1 turndown ratio for the fuel train. Accordingly, the multi-position GSOV can provide enhanced flexibility and control of the flow of fuel through the fuel.

According to some implementations, the multi-position GSOV, as described herein, may be configured for a variety of applications and/or situations. For example, the multi-position GSOV, using an electrically controlled actuator and/or ball valve may handle both relatively high pressures (e.g., greater than 100 kPa) and/or relatively low pressures (e.g., less than 40 kPa). Accordingly, the multi-position GSOV may provide flexibility in use, and can thus be configured for use on one or more various types or sizes of machines and/or engines.

According to some implementations described herein, the multi-position GSOV and control of the multi-position GSOV, as described herein, may conserve hardware resources, power resources, fuel resources, and/or operational resources associated with a fuel train and/or engine. Hardware resources can be conserved by avoiding fuel leaks, resulting in corrosion, short circuiting, fires and/or the like within machines and/or equipment. Power resources associated with a battery and/or starter system of a machine or engine can be conserved by the multi-position GSOV enabling a fast and efficient startup process. Fuel resources are conserved by avoiding wasted fuel from leaks that is not burned, and, thus, is not used to provide power. Operational resources (e.g., financial costs, human resources, opportunity costs, and/or the like) and/or the like can be preserved using the multi-position GSOV, which can result in enhancing the lifetime of the engine and/or machine utilizing such a part, avoiding breakdowns and/or failures of the engine and/or systems of the machine, avoiding repair costs and/or downtime for such breakdowns or failures, and/or the like.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A method, comprising:
   determining, by an engine control module, a value of a parameter associated with a fuel train,
      wherein the fuel train is associated with an engine;
   determining, by the engine control module, a setting associated with the parameter;
   causing, by the engine control module and based on the value of the parameter and the setting, a position of a gas shut-off valve (GSOV) of the fuel train to be reconfigured to cause a flow rate of fuel that is flowing through the GSOV to change from a first flow rate to a second flow rate, wherein the second flow rate is greater than a zero percent flow rate and less than a one hundred percent flow rate; and
   causing, by the engine control module, the position of the GSOV to be reconfigured to cause the flow rate to change from the second flow rate to a third flow rate, wherein the third flow rate is greater than the zero percent flow rate and less than the one hundred percent flow rate.

2. The method of claim 1, further comprising:
   determining the position of the GSOV is at a first position that enables the fuel to flow through the GSOV at a first flow rate,
      wherein causing the position of the GSOV to be reconfigured to cause the flow rate to change from the first flow rate to the second flow rate comprises:
         adjusting the position of the GSOV to a second position that enables fuel to flow through the GSOV at a second flow rate,
            wherein the second flow rate is different than the first flow rate.

3. The method of claim 1, wherein causing the position of the GSOV to be reconfigured to cause the flow rate to change from the first flow rate to the second flow rate increases or decreases a fuel turndown ratio of the fuel train.

4. The method of claim 1, further comprising:
   determining a difference between the setting and the value of the parameter;
   obtaining one or more operating conditions associated with the engine; and
   using a mapping of the difference and the one or more operating conditions to candidate positions of the GSOV to determine the position.

5. The method of claim 1, wherein the GSOV is upstream, relative to a flow of the fuel through the fuel train, from a sensor associated with the parameter.

6. The method of claim 1, wherein the parameter comprises at least one of:
   an inlet pressure of a pressure regulator of the fuel train;
   a pressure of the fuel train; or
   a mass flow of fuel through the fuel train.

7. The method of claim 1, wherein the GSOV comprises an electrically controlled actuator and a ball valve,
   wherein the electrically controlled actuator that is configured to mechanically control a position of the ball valve.

8. The method of claim 1, wherein the second flow rate is one of:
   a 20% of maximum flow rate,
   a 30% of maximum flow rate,
   a 50% of maximum flow rate, or
   a 75% of maximum flow rate.

9. An engine control module, comprising:
   one or more memories; and
   one or more processors, communicatively coupled to the one or more memories, to:
      obtain a setting associated with a parameter associated with a fuel train,
         the parameter comprising at least one of:
            an inlet pressure of a pressure regulator of the fuel train,
            a pressure of the fuel train, or
            a mass flow of fuel through the fuel train;
      determine that a value of the parameter is outside a threshold range of the setting;
      determine a position of a multi-position gas shut-off valve (GSOV) of the fuel train; and
      adjust the position of the multi-position GSOV until the value of the parameter is within the threshold range of the setting,
         wherein the position of the multi-position GSOV is to be adjusted to increase or decrease a flow rate of fuel that is flowing through the multi-position GSOV.

10. The engine control module of claim 9, wherein the one or more processors, when adjusting the position of the multi-position GSOV until the value of the parameter is within the threshold range of the setting, are further to:
    adjust the position of the multi-position GSOV from a first position to a second position,
       wherein the first position enables a different flow rate of the fuel through the multi-position GSOV than the second position; and
    determine, when the multi-position GSOV is in the second position, that the value of the parameter is within the threshold range of the setting.

11. The engine control module of claim 9, wherein the setting is based on one or more operating conditions of an engine associated with the fuel train.

12. The engine control module of claim 9, wherein the fuel train includes one or more fuel valves downstream from the multi-position GSOV, relative to the fuel flowing through the fuel train,
    wherein the one or more fuel valves enable the fuel to be injected into one or more respective combustion chambers of an internal combustion engine.

13. The engine control module of claim 9, wherein the setting is obtained based on one or more operating conditions of an engine of the fuel train.

14. The engine control module of claim 9, wherein the multi-position GSOV comprises an electrically controlled actuator and a ball valve,
    wherein the electrically controlled actuator that is configured to mechanically control a position of the ball valve and the position of the ball valve corresponds to the position of the multi-position GSOV.

15. The engine control module of claim 9, wherein, after adjusting the position of the multi-position GSOV, the flow rate is one of:
a 20% of maximum flow rate,
a 30% of maximum flow rate,
a 50% of maximum flow rate, or
a 75% of maximum flow rate.

16. A system associated with an engine and one or more sensors that monitor one or more components of a fuel train of the engine, the system comprising:
a multi-position gas shut-off valve (GSOV) comprising:
an electrically controlled actuator, and
a ball valve; and
an engine control module to:
receive a value of a parameter based on one or more measurements from the one or more sensors,
the parameter comprising at least one of:
an inlet pressure of a pressure regulator of the fuel train,
a pressure of the fuel train, or
a mass flow of fuel through the fuel train;
obtain a setting associated with the parameter,
wherein the setting and the parameter are associated with one of the one or more components of the fuel train;
compare the value of the parameter and the setting associated with the parameter; and
cause the electrically controlled actuator to adjust a position of the ball valve based on a result of comparing the value of the parameter and the setting associated with the parameter,
wherein adjusting the position of the ball valve increases or decreases a flow rate of fuel through the multi-position GSOV.

17. The system of claim 16, wherein the engine control module is to:
determine a first position of the ball valve based on information received from the electrically controlled actuator; and
when causing the electrically controlled actuator to adjust the position of the ball valve, cause the electrically controlled actuator to adjust the position of the ball valve from the first position to a second position,
wherein a flow rate of fuel flowing through the ball valve in the first position is different than a flow rate of the fuel flowing through the ball valve in the second position.

18. The system of claim 16, wherein the multi-position GSOV is configured within the fuel train to be upstream from the one or more sensors, relative to a flow of fuel through the fuel train.

19. The system of claim 16, wherein the one or more sensors are configured to measure a plurality of parameters associated with at least one of a fuel filter, a pressure regulator, or a fuel valve of the fuel train,
wherein the parameter is one of the plurality of parameters.

20. The system of claim 16, wherein the engine control module is to:
when comparing the value of the parameter and the setting associated with the parameter, determine whether the value of the parameter is outside a threshold range of the setting; and
cause the electrically controlled actuator to adjust the position of the ball valve when the value of the parameter is outside of the threshold range of the setting.

* * * * *